(12) United States Patent
Rotem et al.

(10) Patent No.: US 10,719,613 B1
(45) Date of Patent: Jul. 21, 2020

(54) SYSTEMS AND METHODS FOR PROTECTING NEURAL NETWORK WEIGHTS

(71) Applicant: Facebook, Inc., Menlo Park, CA (US)

(72) Inventors: Nadav Rotem, Santa Clara, CA (US); Abdulkadir Utku Diril, Menlo Park, CA (US); Mikhail Smelyanskiy, Burlingame, CA (US); Jong Soo Park, Mountain View, CA (US); Roman Levenstein, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 223 days.

(21) Appl. No.: 15/903,162

(22) Filed: Feb. 23, 2018

(51) Int. Cl.
*G06F 21/60* (2013.01)
*H04L 29/06* (2006.01)
*G06N 3/04* (2006.01)
*G06N 3/063* (2006.01)
*H04L 9/06* (2006.01)

(52) U.S. Cl.
CPC ............. *G06F 21/602* (2013.01); *G06N 3/04* (2013.01); *G06N 3/063* (2013.01); *H04L 9/0656* (2013.01)

(58) Field of Classification Search
CPC .. G06N 3/08; G06N 3/10; G06N 3/04; G06N 3/063; G06N 3/088; G06N 3/0454; G06F 21/602; H04L 9/06565; H04L 9/0464; H04L 9/0435
See application file for complete search history.

(56) References Cited

U.S. PATENT DOCUMENTS

| | | | | |
|---|---|---|---|---|
| 9,524,370 | B2 * | 12/2016 | Raisaro | H04L 9/008 |
| 2014/0180989 | A1 * | 6/2014 | Krizhevsky | G06N 3/063 706/31 |
| 2017/0070517 | A1 * | 3/2017 | Bailey | G06F 16/9535 |
| 2017/0372201 | A1 * | 12/2017 | Gupta | G06N 3/084 |
| 2018/0096078 | A1 * | 4/2018 | Leeman-Munk | G06N 3/0454 |
| 2019/0005375 | A1 * | 1/2019 | Mody | G06N 3/04 |
| 2019/0147344 | A1 * | 5/2019 | Zhang | G06N 3/08 |
| 2019/0296910 | A1 * | 9/2019 | Cheung | G06N 3/0481 |
| 2019/0334716 | A1 * | 10/2019 | Kocsis | H04L 63/0442 |

OTHER PUBLICATIONS

Rotem, et al., Systems and Methods for Efficiently Updating Neural Networks, Co-pending U.S. Appl. No. 15/991,120, filed Mar. 4, 2018.

* cited by examiner

*Primary Examiner* — Amir Mehrmanesh
(74) *Attorney, Agent, or Firm* — FisherBroyles, LLP (57) ABSTRACT

The disclosed computer-implemented method may include (i) identifying a neural network that comprises an interconnected set of nodes organized in a set of layers represented by a plurality of matrices that each comprise a plurality of weights, where each weight represents a connection between a node in the interconnected set of nodes that resides in one layer in the set of layers and an additional node in the set of interconnected nodes that resides in a different layer in the set of layers, (ii) encrypting, using an encryption cipher, the plurality of weights, (iii) detecting that execution of the neural network has been initiated, and (iv) decrypting, using the encryption cipher, the plurality of weights in response to detecting that the execution of the neural network has been initiated. Various other methods, systems, and computer-readable media are also disclosed.

19 Claims, 8 Drawing Sheets

SYSTEMS AND METHODS FOR PROTECTING NEURAL NETWORK WEIGHTS

BACKGROUND

Neural networks are a machine learning technique with a wide variety of applications, including processing visual input and categorizing textual data. Neural networks can be structured in a variety of different ways depending on the application and may require large amounts of training time or data to achieve peak, or even tolerable, performance. Configuration choices for neural networks may also make a large difference in the effectiveness of the network. Some organizations may devote large amounts of time and resources to optimizing the configuration of a neural network for performing a certain task. Protecting this neural network data may be as important as protecting other types of trade secrets, such as product formulas or proprietary code.

An attacker who gains access to the matrices that represent the weights of connections between nodes of a neural network may be able to reverse-engineer the neural network to determine what function the neural network performs. The attacker may then use this data to reconstruct a similar neural network or to find a buyer for the neural network information. The instant disclosure, therefore, identifies and addresses a need for systems and methods for protecting neural network weights from interception and copying.

SUMMARY

As will be described in greater detail below, the instant disclosure describes systems and methods for protecting neural networks by encrypting the matrices that store the weights for the neural networks.

In one example, a computer-implemented method may include (i) identifying a neural network that includes an interconnected set of nodes organized in a set of layers represented by a group of matrices that each include a group of weights, where each weight represents a connection between a node in the interconnected set of nodes that resides in one layer in the set of layers and an additional node in the set of interconnected nodes that resides in a different layer in the set of layers, (ii) encrypting, using an encryption cipher, the weights, (iii) detecting that execution of the neural network has been initiated, and (iv) decrypting, using the encryption cipher, the weights in response to detecting that the execution of the neural network has been initiated.

In one embodiment, decrypting, using the encryption cipher, the weights in response to detecting that the execution of the neural network has been initiated may include decrypting, by a hardware component executing the neural network, the weights. In some examples, decrypting the weights may include (i) storing an encrypted version of the weights in a non-volatile storage medium, (ii) avoiding storing a decrypted version of the weights in the non-volatile storage medium by storing the decrypted version of the weights in a volatile storage medium during execution of the neural network, and (iii) discarding, after completion of the execution of the neural network, the decrypted version of the weights stored in the volatile storage medium.

In one embodiment, decrypting, using the encryption cipher, the weights in response to detecting that the execution of the neural network has been initiated may include decrypting, by software executing the neural network, the weights. In one embodiment, decrypting, by the software executing the neural network, the weights may include decrypting a file that includes the weights and executing the file that includes the weights.

In some embodiments, the neural network may include a hardware neural network that includes circuit architecture designed to execute neural networks more efficiently than general purpose computer processing unit architecture. In some examples, decrypting, by the hardware neural network, the plurality of weights may be in response to the hardware neural network loading the plurality of weights during the initiation of an execution of the hardware neural network. In some examples, decrypting, by the hardware neural network, the plurality of weights may be in response to the hardware neural network storing the plurality of weights to the hardware neural network.

In one embodiment, the computer-implemented method may further include re-encrypting the weights in response to determining that that the execution of the neural network has completed. In some examples, encrypting the weights may include preventing an attacker from obtaining the weights in order to reverse-engineer the neural network by using the weights to reconstruct the interconnected set of nodes and observing which nodes in the interconnected set of nodes are excited by each input in a set of inputs. In some examples, encrypting the weights may include compressing the weights and encrypting the weights in response to having compressed the weights.

In one embodiment, the encryption cipher may include a stream cipher that combines an input stream that may include the weights with an additional input stream that may include a pseudorandom cipher digit stream. In some examples, encrypting the weights may include performing an exclusive-or operation on the input stream that may include the weights and the additional input stream that may include the pseudorandom cipher digit stream.

In one embodiment, the neural network may include a convolutional neural network that processes visual input by dividing the visual input into a group of subsets and processing each subset within the subsets with a different subset of nodes within the interconnected set of nodes. In some embodiments, the weights may include bias and weight information for nodes that are part of fully-connected layers within the set of layers and filter and bias information for nodes that are part of convolution layers within the set of layers.

In one embodiment, a system for implementing the above-described method may include (i) an identification module, stored in memory, that identifies a neural network that includes an interconnected set of nodes organized in a set of layers represented by a group of matrices that each include a group of weights, where each weight represents a connection between a node in the interconnected set of nodes that resides in one layer in the set of layers and an additional node in the set of interconnected nodes that resides in a different layer in the set of layers, (ii) an encryption module, stored in memory, that encrypts, using an encryption cipher, the weights, (iii) a detection module, stored in memory, that detects that execution of the neural network has been initiated, (iv) a decryption module, stored in memory, that decrypts, using the encryption cipher, the weights in response to detecting that the execution of the neural network has been initiated, and (v) at least one physical processor that executes the identification module, the encryption module, the detection module, and the decryption module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a neural network that includes an interconnected set of nodes organized in a set of layers represented by a group of matrices that each include a group of weights, where each weight represents a connection between a node in the interconnected set of nodes that resides in one layer in the set of layers and an additional node in the set of interconnected nodes that resides in a different layer in the set of layers, (ii) encrypt, using an encryption cipher, the weights, (iii) detect that execution of the neural network has been initiated, and (iv) decrypt, using the encryption cipher, the weights in response to detecting that the execution of the neural network has been initiated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting neural network weights from illicit interception and/or copying. As will be explained in greater detail below, by encrypting the matrices that contain weight information for a neural network when the neural network is not executing, the systems and methods described herein may prevent attackers from obtaining neural network weight data. By encrypting weight matrices in this way, the systems and methods described herein may protect neural network weight data from being used to determine the functioning and/or design choices of the neural network, and may accomplish this protection without interfering with the execution of the neural network. In addition, the systems and methods described herein may improve the functioning of a computing device by improving the security of data stored on and/or transmitted to the computing device. These systems and methods may also improve the field of machine learning and/or neural networks by enabling a neural network to be operated with greater information security.

Figure 1:
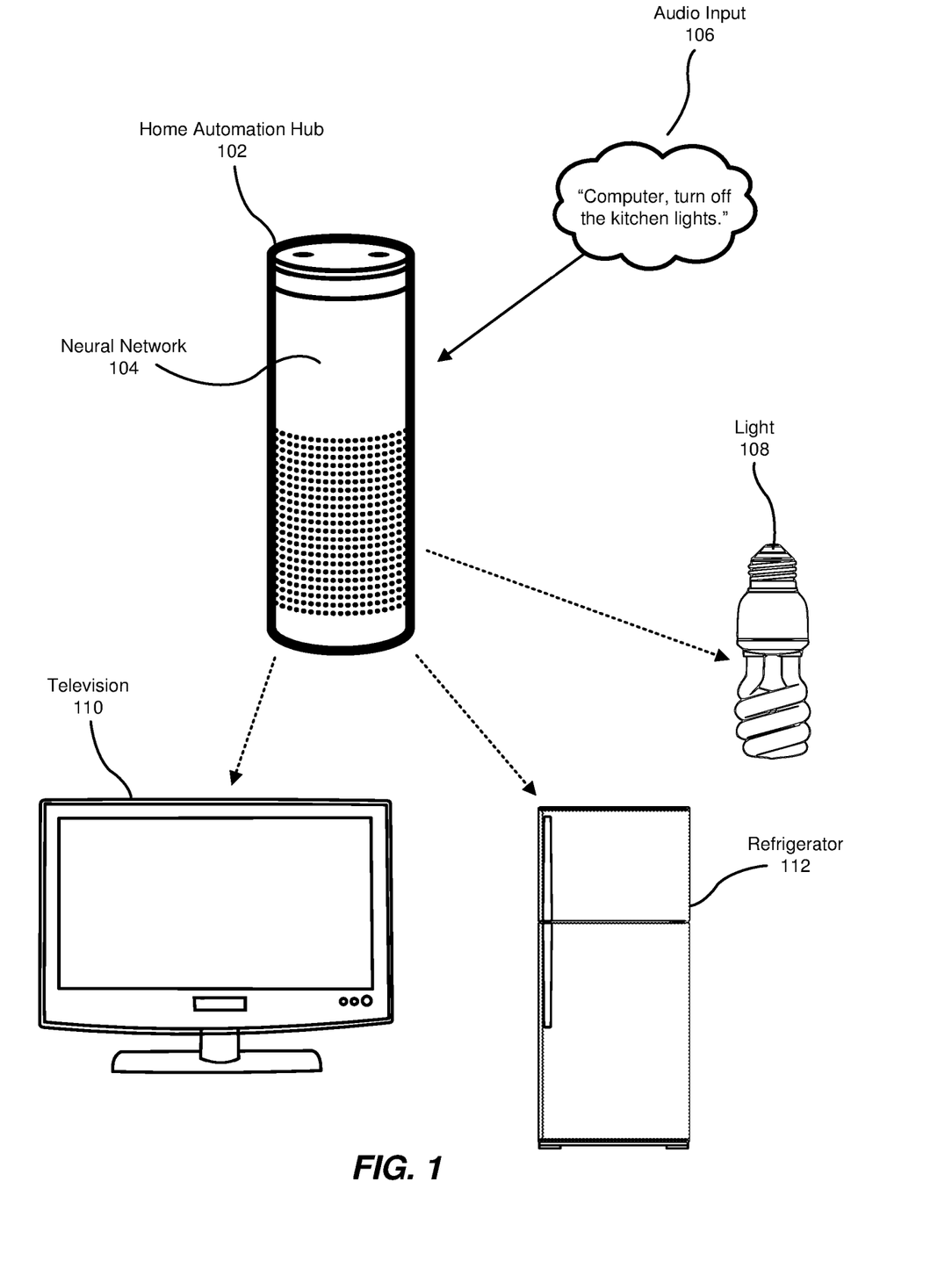
FIG. 1 is an illustration of an exemplary neural network in context.
Figure 2:
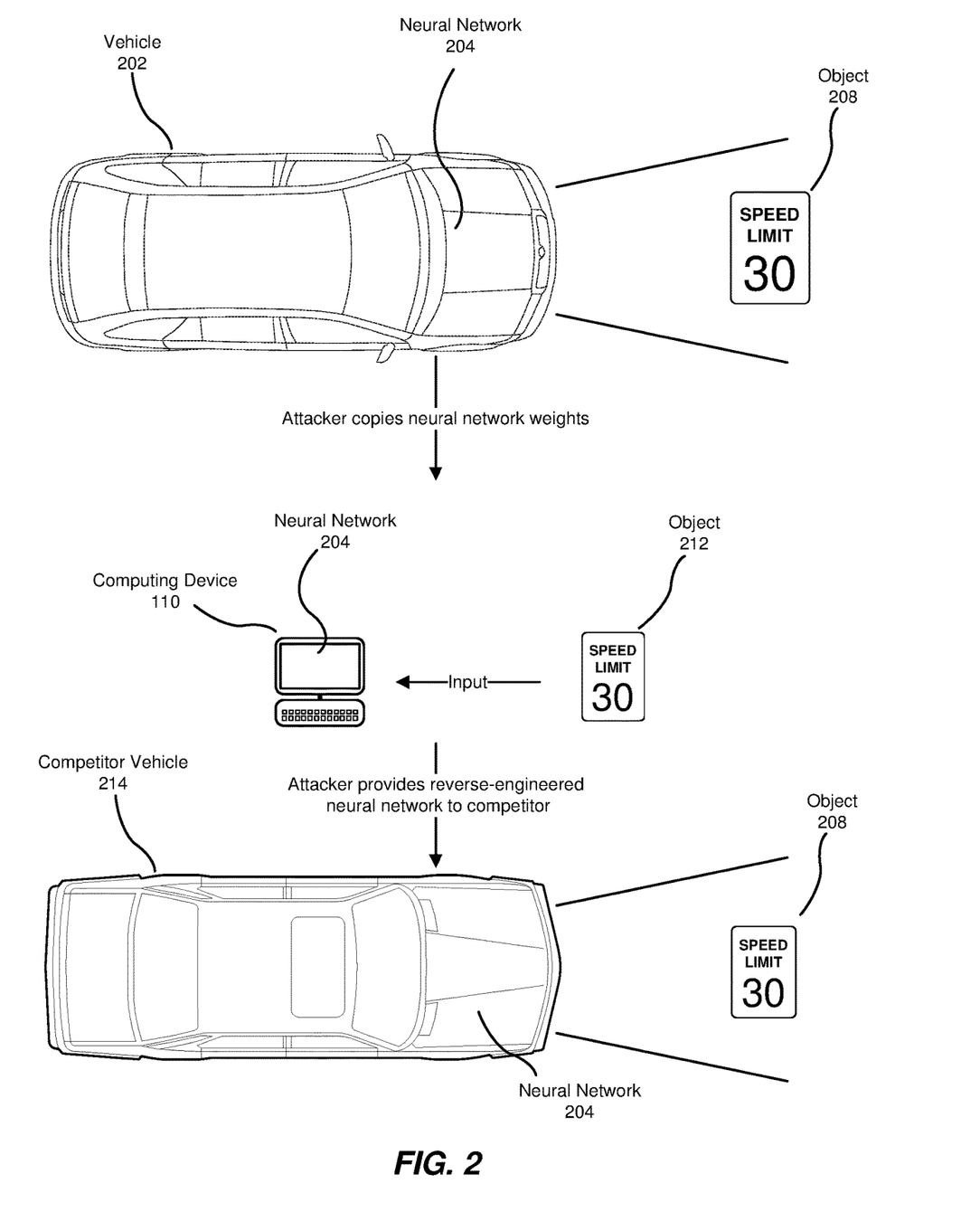
FIG. 2 is an illustration of an exemplary neural network in context.
Figure 5:
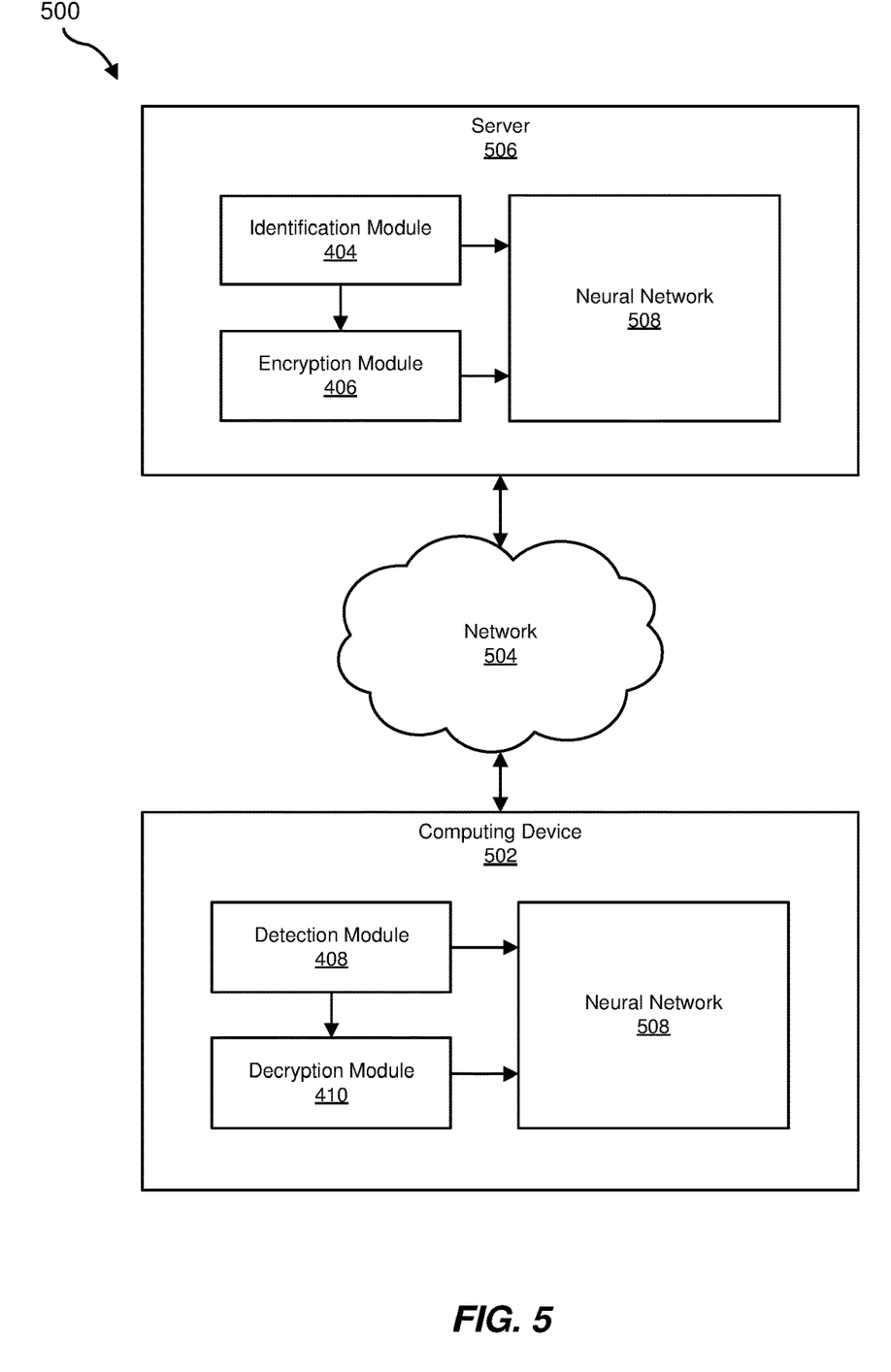
FIG. 5 is a block diagram of an additional exemplary computing system for protecting neural networks.
Figure 6:
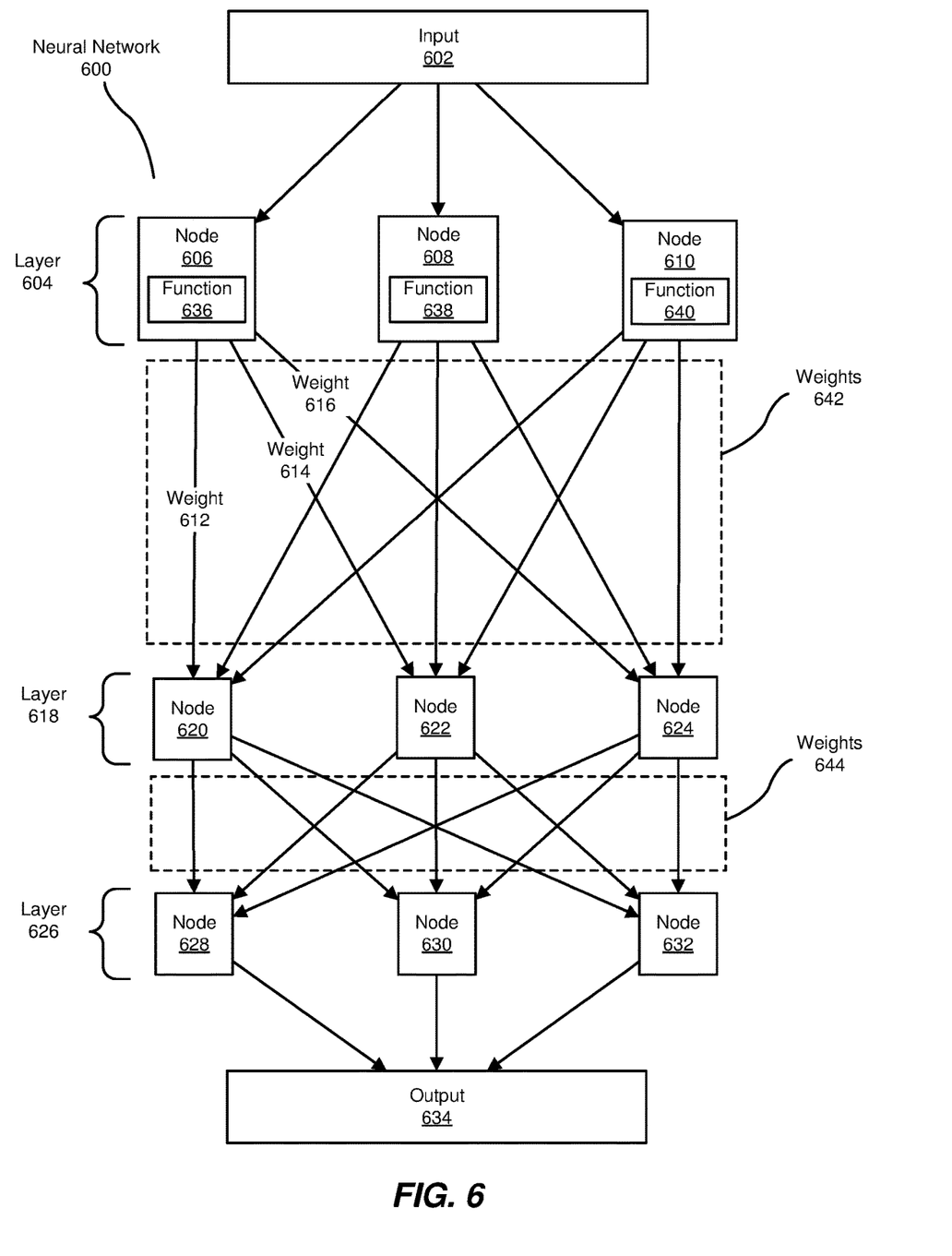
FIG. 6 is a block diagram of an exemplary neural network.

The following will provide, with reference to FIGS. 1, 2, and 6, detailed descriptions of exemplary neural networks. Detailed descriptions of an exemplary method for protecting neural networks will be provided in connection with FIGS. 3 and 8. Additionally, detailed descriptions of exemplary systems for protecting neural networks will be provided in connection with FIGS. 4, 5 and 7.

Neural networks are applicable to many types of problems. One common application of neural networks is to the problem of recognizing and/or classifying data, such as image data, video data, and/or audio data. In some examples, a neural network may classify image files, for example by identifying which individuals are present in a photograph posted to a social media platform. In other examples, a neural network may classify live video data and/or live audio data. FIG. 1 is an illustration of an exemplary neural network 104 that enables home automation hub 102 to process audio input 106. In some examples, home automation hub 102 may connect to a variety of smart devices such as lights, cameras, sound systems, kitchen appliances, locks, and/or media centers. In one example, home automation hub 102 may control light 108, television 110, and/or refrigerator 112. In one embodiment, home automation hub 102 may receive audio input from one or more users and neural network 104 may parse the audio input for keywords and/or phrases that indicate actions that home automation hub 102 should direct other systems to perform. For example, audio input 106 may, when parsed by neural network 104, direct home automation hub 102 to send a signal to light 108 that causes light 108 to turn off.

In some examples, an attacker may attempt to obtain neural network data in order to study and/or copy a neural network, such as neural network 104 in FIG. 1. To provide another example, FIG. 2 is an illustration of an exemplary neural network 204 that enables a vehicle 202 to classify an object 208. In some examples, neural network 204 may be part of the operating system of a fully or partially self-driving car and may classify objects in order to aid vehicle 202 in obeying traffic laws and/or avoiding collisions.

In one example, an attacker may copy the matrices containing the weights for neural network 204 to a computing device 210. In some examples, the attacker may then present neural network 204 on computing device 210 with object 212. By tracking which nodes in neural network 204 are excited by object 212 and/or each object in a set of objects, the attacker may determine what objects neural network 204 is configured to identify and/or other valuable information about neural network 204. In some examples, object 212 may be an image file on computing device 210, while in other examples, object 212 may be a physical object displayed to a camera of computing device 210.

In some examples, the attacker may then provide the reverse-engineered neural network to a competitor of the creators of vehicle 202. The competitors may then configure a competitor vehicle 214 with neural network 204 and/or a neural network developed based on data gleaned from neural network 204, enabling competitor vehicle 214 to recognize object 208 without the competitor investing the time and resources to develop a neural network from scratch. In some instances, this may give the competitor a significant advantage over the developers of the original neural network. In order to prevent this, it may be advantageous for the developers of neural networks to protect neural network data from illicit copying.

Figure 3:
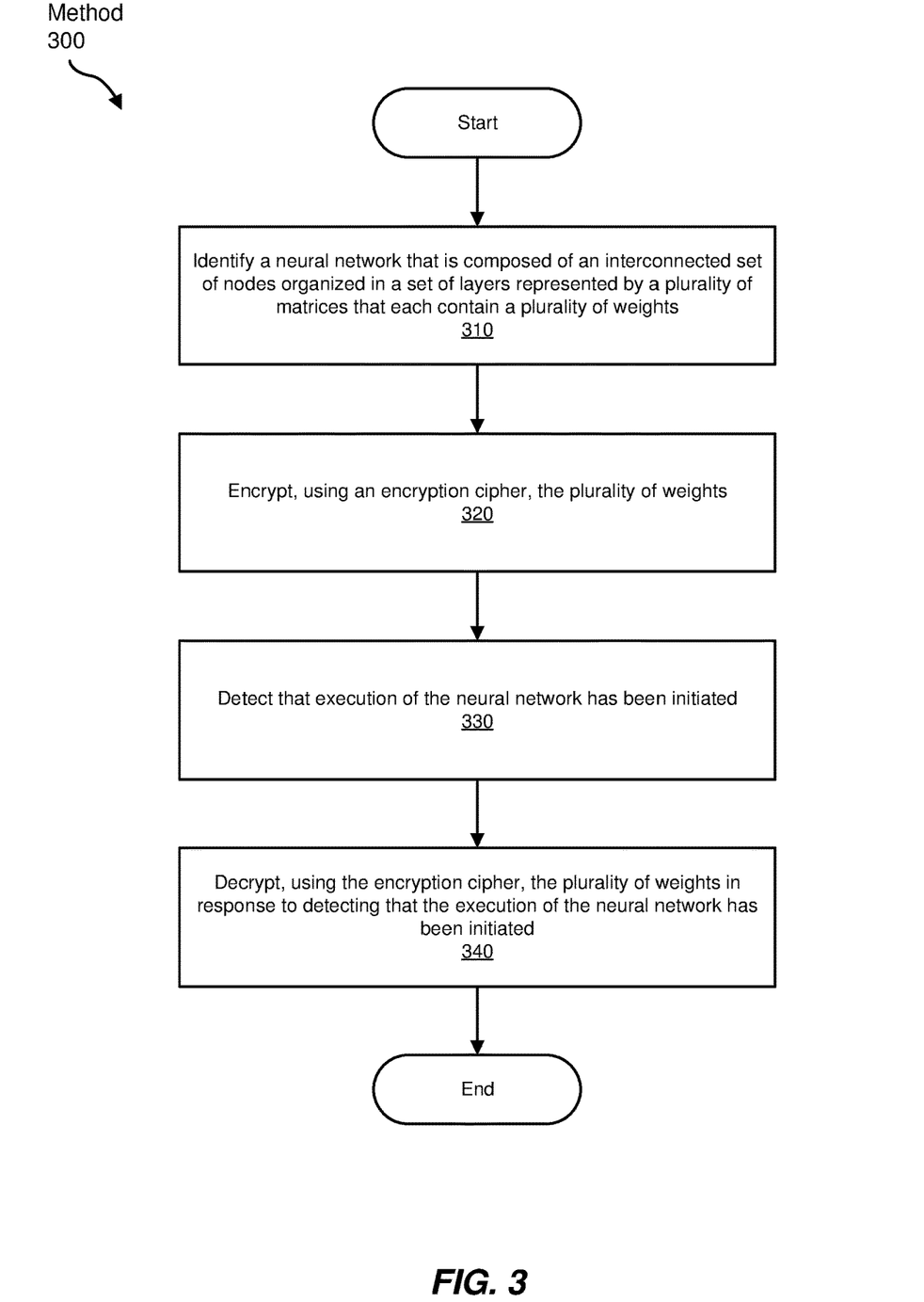
FIG. 3 is a flow diagram of an exemplary method for protecting neural networks.

FIG. 3 is a flow diagram of an exemplary computer-implemented method 300 for protecting neural networks. The steps shown in FIG. 3 may be performed by any suitable computer-executable code and/or computing system, including the system(s) illustrated in FIGS. 4 and 5. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may identify a neural network that may include an interconnected set of nodes organized in a set of layers represented by a plurality of matrices that each store a plurality of weights, where each weight represents a connection between a node in the interconnected set of nodes that resides in one layer in the set of layers and an additional node in the set of interconnected nodes that resides in a different layer in the set of layers.

In some examples, the term "neural network," as used herein, may refer to any physical or virtual computing system that contains a collection of connected nodes. In some embodiments, nodes may be organized into layers and may be connected to some or all nodes in adjacent layers. In some embodiments, the connections between nodes may be regulated by a weight that the information from the sending node is given by the receiving node. In one embodiment, weights, and therefore the organization of and connections between nodes, may be represented as numerical data stored in a set of matrices. In some examples, weights may be integers, while in other examples, weights may include non-integer values.

In some examples, the term "node," as used herein, may refer to a mathematical function that represents an artificial neuron within a neural network. In some embodiments, a node may receive one or more inputs from nodes in another layer, apply an activation function to the input, and send the result to one or more additional nodes in a different layer. In some embodiments, a node may also receive input in the form of a bias, a static term that is added to all output produced by the node. In some examples, a bias may be used to perform an affine transformation on data produced by the node and/or the neural network. In some embodiments, all nodes within the same layer may have the same bias. In one embodiment, bias information for a layer of nodes may be stored alongside weight information for the layer of nodes.

In some examples, a neural network may be a convolutional neural network. A convolutional neural network is a type of neural network typically applied to analyzing visual data that include a mix of convolutional, pooling, and/or fully connected layers. A fully connected layer is a layer where each node in the layer is connected to each other node in each of the adjacent layers. By contrast, a convolutional layer contains nodes that are only connected to a subset of the nodes in the previous layer. For example, a convolutional layer that is connected to a layer containing 2,000 nodes may contain nodes that are each connected to a four by four square containing sixteen nodes in the previous layer. Pooling layers contain nodes that combine inputs from a cluster of nodes in the previous layer. In some examples, a pooling layer may use the maximum value from the cluster of nodes, while in other examples a pooling layer may use the average value. In some embodiments, the plurality of matrices may include bias and weight information for nodes that are part of fully-connected layers within the set of layers and/or filter and bias information for nodes that are part of convolution layers within the set of layers. In some examples, a convolutional neural network may process visual input by dividing the visual input into subsets and processing each subset with a different subset of nodes within the interconnected set of nodes, for example by using a combination of convolution and/or pooling layers.

The systems described herein may perform step 310 in a number of ways. For example, the systems described herein may identify a neural network that is stored or about to be stored in non-volatile memory (i.e., memory stores data when a computing device is powered down). Additionally or alternatively, the systems described herein may identify a neural network that is about to be or in the process of being transmitted from one device to another.

Figure 4:
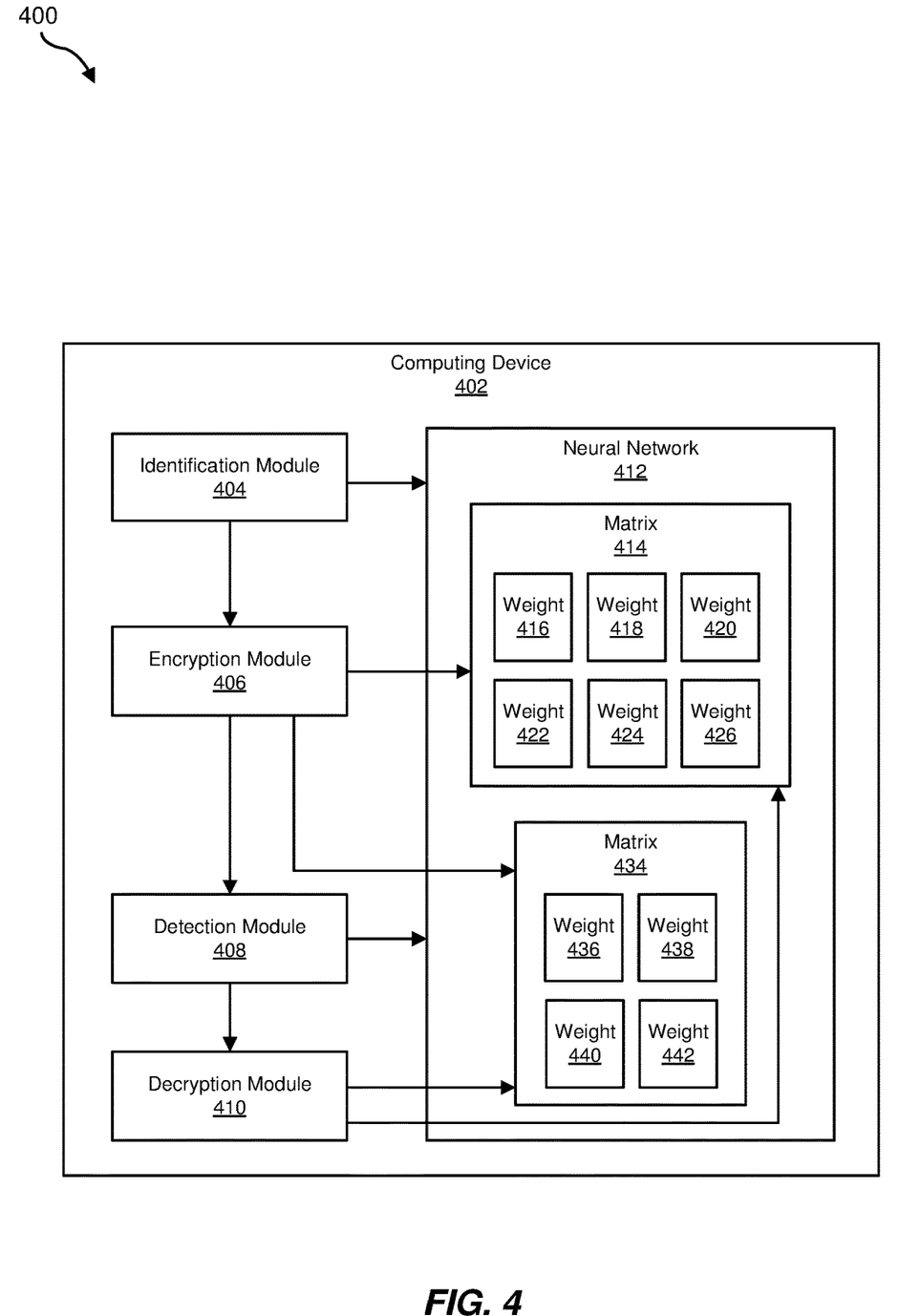
FIG. 4 is a block diagram of an exemplary system for protecting neural networks.

In some embodiments, the systems described herein may all be located on a single device and may encrypt a neural network when the neural network is not being executed and decrypt the neural network when the neural network is being executed. For example, as illustrated in FIG. 3, a system 400 may include a computing device 402 that hosts an identification module 404, an encryption module 406, a detection module 408, and/or a decryption module 410. In some examples, identification module 404 may identify a neural network 412 that includes a matrix 414 and/or a matrix 434. In some embodiments, matrix 414 and/or matrix 434 may contain a plurality of weights, such as weights 416, 418, 420, 422, 424, and/or 426 illustrated within matrix 414 and/or weights 436, 438, 340, and/or 342 illustrated within matrix 434. In some embodiments, encryption module 406 may encrypt matrices 414 and/or 434 and decryption module 410 may decrypt matrices 414 and/or 434 all on computing device 402.

Additionally or alternatively, the systems described herein may be located on separate devices and may encrypt a neural network prior to transmission and/or decrypt the neural network after transmission. For example, as illustrated in FIG. 5, a system 500 may include a computing device 502 that communicates with a server 506 via a network 504. In one example, identification module 304 may identify a neural network 508 on server 506 and encryption module 306 on server 506 may encrypt neural network 508. In some examples, server 506 may transmit the encrypted form of neural network 508 to computing device 502 via network 504. At some later time, detection module 408 on computing device 502 may detect that an execution of neural network 508 has been executed, prompting decryption module 410 to decrypt neural network 508 on computing device 502.

Returning to FIG. 3, at step 320, one or more of the systems described herein may encrypt, using an encryption cipher, the plurality of weights.

In some examples, the term "encryption cipher," as used herein, may refer to any algorithm used to encode data to prevent unauthorized access to and/or usage of that data. In some examples, an encryption cipher may be a stream cipher that combines an input stream that includes the plurality of weights with an additional input stream that includes a pseudorandom cipher digit stream to produce an encrypted form of the weights. In some embodiments, the systems described herein may encrypt the weights by performing an exclusive-or operation on the weights and the pseudorandom cipher digit stream.

The systems described herein may encrypt the weights in a variety of ways and/or contexts. Because encryption may prevent effective compression (e.g., due to encrypted data being pseudo-random), in some examples, the systems described herein may first compress the weights and then encrypt the weights. Additionally or alternatively, the systems described herein may detect that another system has compressed the weights and may encrypt the weights in response to detecting that the weights have been compressed.

In some embodiments, the systems described herein may encrypt all of the data that represents the neural network. In other embodiments, the systems described herein may encrypt only the matrices containing the weights between nodes of the neural network and may not encrypt other portions of the data that represents the neural network. Additionally or alternatively, the systems described herein may encrypt matrices that represent weights, biases, and filters, but may not encrypt neural network data that is not stored in matrices. For example, as illustrated in FIG. 6, a neural network 600 may take in an input 602 and produce an output 634 via layers 604, 618, and/or 626. In some embodiments, layer 604 of may include nodes 606, 608, and/or 610 that may be configured with activation functions 636, 638, and/or 640, respectively. In some examples, layer 618 may include nodes 622, 622, and/or 624 and/or layer 626 may include nodes 628, 630, and/or 632. In some examples, the nodes in layer 618 and/or layer 626 may also have activation functions.

In one embodiment, input sent by the nodes in layer 604 to the nodes in layer 618 may be weighted using weights 642. For example, values sent from node 606 to node 620 may be weighted with weight 612, values sent from node 606 to node 622 may be weighted with weight 614, and/or values sent from node 606 to node 624 may be weighted with weight 616. Similarly, values sent from each of the other nodes in layer 604 to each node in layer 618 may have individual weights. In some embodiments, input sent by the nodes in layer 618 to the nodes in layer 626 may be weighted with weights 644.

In some embodiments, the systems described herein may encrypt weights 642 and/or 644 but may not encrypt activation functions 636, 638, and/or 640. In some examples, the systems described herein may encrypt only weights 642 and/or 644 but may not encrypt any other data pertaining to neural network 600.

Returning to FIG. 3, at step 330, one or more of the systems described herein may detect that execution of the neural network has been initiated.

The systems described herein may detect that execution of the neural network has been initiated in a variety of ways. For example, the systems described herein may be part of the system that executes the neural network. In other embodiments, the systems described herein may intercept calls to initiate the execution of the neural network.

At step 340, one or more of the systems described herein may decrypt, using the encryption cipher, the plurality of weights in response to detecting that the execution of the neural network has been initiated.

The systems described herein may decrypt the weights in a variety of ways and/or contexts. In some embodiments, the systems described herein may decrypt the weights via a hardware component. Additionally or alternatively, the systems described herein may decrypt the weights via a software component.

Hardware neural networks, also known as physical neural networks, may be implemented in a variety of ways. In some embodiments, a hardware neural network may include circuit architecture designed to execute neural networks more efficiently than general purpose computer processing unit architecture. For example, a hardware neural network may include memristors, an electrical component that regulates the flow of current through a circuit and acts as a non-volatile storage element that retains information on how much current has previously flowed through the memristor. In one embodiment, the systems described herein may decrypt the weights prior to configuring memristors to represent the weights. In some embodiments, the hardware neural network may store encrypted data within hardware neural network components before decrypting the data and using the decrypted data to configure the hardware neural network.

In some examples, the systems described herein may store the encrypted version of the weights in a non-volatile storage medium (including but not limited to a hard disk drive, solid state drive, and/or flash memory) and may avoid storing the decrypted version of the weights in the non-volatile storage medium by storing the decrypted version of the plurality of weights in a volatile storage medium (such as random-access memory) during execution of the neural network. In some embodiments, the systems described herein may, after completion of the execution of the neural network, discard the decrypted version of the weights stored in the volatile storage medium. By only storing the unencrypted version of the weights in volatile storage, the systems described herein may limit the window in which an attacker can access unencrypted data.

In some embodiments, the neural network may be a software neural network that operates on standard computer processor architecture rather than making use of specialized architecture. In one embodiment, the systems described herein may decrypt, by software executing the neural network, the weights. For example, the systems described herein may decrypt a file that includes the weights and execute the file that includes the weights, read from the file that includes the weights during execution, and/or use the file that includes the weights as a parameter while executing. In some embodiments, the file storing the weights may be a flat file. In other embodiments, the file storing the weights may be a data file designed for storing neural network weight data.

Figure 7:
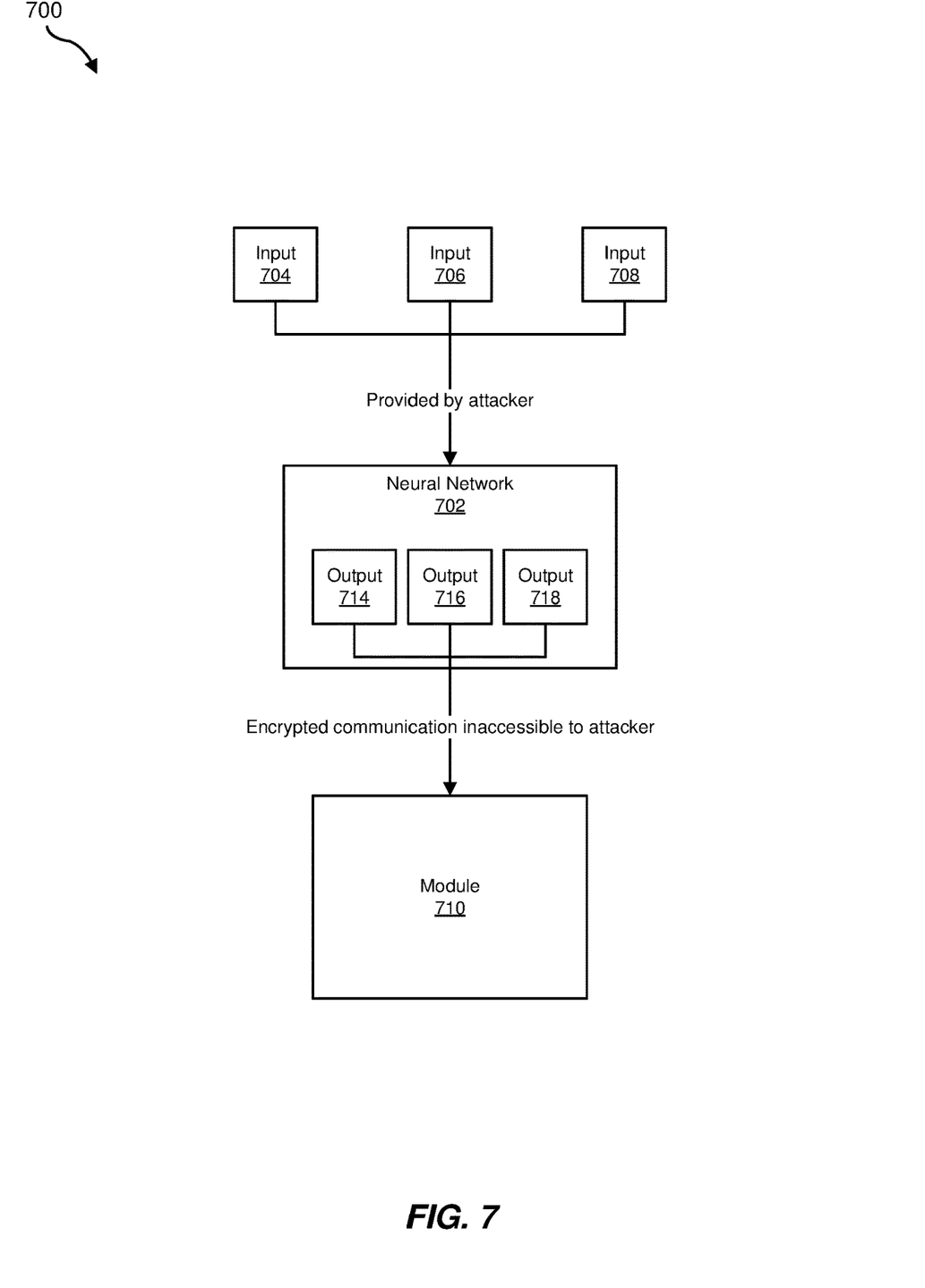
FIG. 7 is a block diagram of an exemplary system for protecting neural networks.

In some embodiments, the systems described herein may prevent an attacker from observing the output of the neural network produced in response to specified inputs by encrypting, obfuscating, and/or otherwise securing communication between the neural network and a system that receives output from the neural network (e.g., to make use of the output as a part of a larger system). In some embodiments, the systems described herein may secure communication between hardware modules. Additionally or alternatively, the systems described herein may secure communication between software modules. For example, as illustrated in FIG. 7, a system 700 may include a neural network 702 in communication with a module 710. In some examples, an attacker may provide inputs 704, 706, and/or 708 to neural network 702 in an attempt to determine the output produced by neural network 702 in response to each input. In some embodiments, neural network 702 may produce output 714 in response to input 704, output 716 in response to input 706, and/or output 718 in response to input 708. In one embodiment, neural network 702 may communicate with module 710 via an encrypted communication channel, preventing the attacker from observing outputs 714, 716, and/or 718 and/or correlating outputs 714, 716, and/or 718 to inputs 704, 706, and/or 708, respectively.

In some embodiments, systems described herein may re-encrypt the weights in response to determining that that the execution of the neural network has completed. For example, as illustrated in method 800 in FIG. 8, at step 810, the systems described herein may detect that the weights have been compressed for storage in non-volatile memory and/or for transmission. In some embodiments, at step 820, the systems described herein may compress the weights using a stream cipher. In some cases, at step 830, the systems described herein may prevent an attacker from copying the weights and using the copied weights to reverse engineer the neural network. For example, an attacker may attempt to copy the weights from the non-volatile storage medium and/or may intercept the weights while the weights are being transmitted between devices but may be unable to access the weights because the weights are encrypted.

Figure 8:
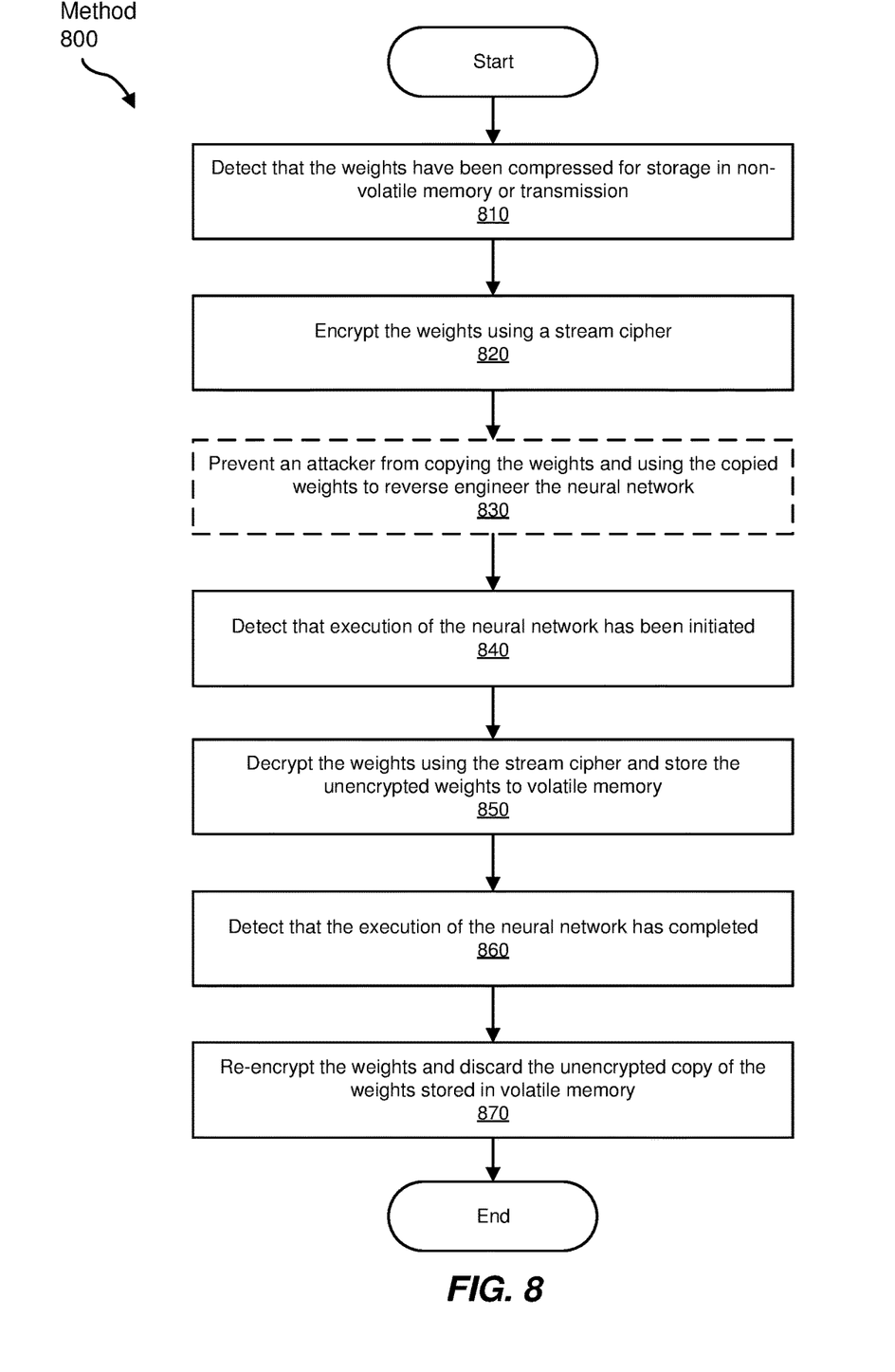
FIG. 8 is a flow diagram of an exemplary method for protecting neural networks.

At some later time, at step 840, the systems described herein may detect that execution of the neural network has been initiated. In some embodiments, at step 850, the systems described herein may decrypt the weights using the stream cipher and store the unencrypted weights to volatile memory. In some examples, the unencrypted weights may be stored in volatile memory and/or hardware components while the neural network is executing. At step 860, the systems described herein may detect that the execution of the neural network has completed. At step 880, the systems described herein may re-encrypt the weights and discard the unencrypted version of the weights stored in volatile memory, ensuring that only the encrypted version of the weights is stored in non-volatile memory.

In some examples, the systems described herein may prevent an attacker from reverse-engineering a larger system of which the neural network is part. For example, if the neural network recognizes street signs, obstacles, and other objects on or near roads as part of an autonomous vehicle, the neural network may send signals to the brakes when certain objects are recognized and signals to the steering control when other objects are recognized. In this example, by enumerating the objects recognized by the neural network and tracing the signals sent by the neural network in response to these objects, an attacker may determine information about modules that control various systems in the vehicle. In other examples, the systems described herein may prevent an attacker from directly copying a neural network for use in a competitor's product. For example, if a neural network recognizes individuals in photos uploaded to a social media site, an attacker who copies the neural network in its entirety may launch a competing social media site without investing the resources necessary to develop the neural network. Additionally or alternatively, an attacker may copy a neural network and then continue training the neural network, developing a different, potentially superior neural network while investing far fewer resources than the original creator of the neural network. By preventing the copying and/or reverse engineering of neural networks, the systems described herein may enable the creators of neural networks to retain competitive advantages that result from the creation of the neural networks.

As explained in connection with method 300 above, the systems and methods described herein may protect neural networks from being copied by encrypting neural network data. In many embodiments, neural networks use large matrices to store the training state of the network. For example, in a convolutional neural network, the fully-connected layers save the bias and weight of each neuron, and the convolution layers save the filter and bias of the transformation. In some cases, given a file that contains layers, an attacker may reverse engineer the content of the network. For example, in the context of image recognition software an attacker may be able to identify which objects are identified by the network by enumerating different possibilities and record which outputs are activated. In order to prevent this, the systems and methods described herein may encrypt neural network weights. In some embodiments, encryption may be applied after the weights are compressed, because encryption prevents compression. In some examples, the systems described herein may use a stream cypher (such as a linear shift register) to encrypt the weights when they are stored on a disk. In some embodiments, the systems described herein may decrypt the weights via the network executor (either in hardware or by software emulation) at runtime. By encrypting the weights during storage and decrypting the weights at runtime, the systems and methods described herein may reduce a neural network's vulnerability to copying without interfering with the execution of the neural network.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" may refer to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" may refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive neural network data to be transformed, transform the neural network data by encrypting matrices, output a result of the transformation to a transmission and/or storage module, use the result of the transformation to transmit and/or store encrypted neural network data, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some examples, the term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, at least a portion of the method being performed by a computing device comprising at least one processor, the method comprising:
    identifying a neural network that comprises an interconnected set of nodes organized in a set of layers represented by a plurality of matrices that each comprise a plurality of weights, wherein each weight represents a connection between a node in the interconnected set of nodes that resides in one layer in the set of layers and an additional node in the set of interconnected nodes that resides in a different layer in the set of layers, wherein:
        the neural network comprises a convolutional neural network that processes inputs by dividing the input into a plurality of subsets and processing each subset within the plurality of subsets with a different subset of nodes within the interconnected set of nodes; and
        the plurality of weights comprises:
            bias and weight information for nodes that are part of fully-connected layers within the set of layers; and
            filter and bias information for nodes that are part of convolutional layers within the set of layers;
    encrypting, using an encryption cipher, the plurality of weights;
    detecting that execution of the neural network has been initiated; and
    decrypting, using the encryption cipher, the plurality of weights in response to detecting that the execution of the neural network has been initiated.

2. The computer-implemented method of claim 1, wherein encrypting the plurality of weights comprises:
    compressing the plurality of weights; and
    encrypting the plurality of weights in response to having compressed the plurality of weights.

3. The computer-implemented method of claim 1, wherein decrypting, using the encryption cipher, the plurality of weights in response to detecting that the execution of the neural network has been initiated comprises decrypting, by a hardware component executing the neural network, the plurality of weights.

4. The computer-implemented method of claim 1, wherein decrypting the plurality of weights comprises:
    storing an encrypted version of the plurality of weights in a non-volatile storage medium;
    avoiding storing a decrypted version of the plurality of weights in the non-volatile storage medium by storing the decrypted version of the plurality of weights in a volatile storage medium during execution of the neural network; and
    discarding, after completion of the execution of the neural network, the decrypted version of the plurality of weights stored in the volatile storage medium.

5. The computer-implemented method of claim 1, wherein decrypting, using the encryption cipher, the plurality of weights in response to detecting that the execution of the neural network has been initiated comprises decrypting, by software executing the neural network, the plurality of weights.

6. The computer-implemented method of claim 5, wherein decrypting, by the software executing the neural network, the plurality of weights comprises:
    decrypting a file that comprises the plurality of weights; and
    executing the file that comprises the plurality of weights.

7. The computer-implemented method of claim 1, further comprising re-encrypting the plurality of weights in response to determining that that the execution of the neural network has completed.

8. The computer-implemented method of claim 1, wherein encrypting the plurality of weights comprises preventing an attacker from obtaining the plurality of weights in order to reverse-engineer the neural network by using the plurality of weights to reconstruct the interconnected set of nodes and observing which nodes in the interconnected set of nodes are excited by each input in a set of inputs.

9. The computer-implemented method of claim 1, wherein the encryption cipher comprises a stream cipher that combines an input stream that comprises the plurality of weights with an additional input stream that comprises a pseudorandom cipher digit stream.

10. The computer-implemented method of claim 9, wherein encrypting the plurality of weights comprises performing an exclusive-or operation on the input stream that comprises the plurality of weights and the additional input stream that comprises the pseudorandom cipher digit stream.

11. The computer-implemented method of claim 1, wherein the neural network comprises a convolutional neural network that processes visual input.

12. A system comprising:
   an identification module, stored in memory, that identifies a neural network that comprises an interconnected set of nodes organized in a set of layers represented by a plurality of matrices that each comprise a plurality of weights, wherein each weight represents a connection between a node in the interconnected set of nodes that resides in one layer in the set of layers and an additional node in the set of interconnected nodes that resides in a different layer in the set of layers, wherein:
      the neural network comprises a convolutional neural network that processes inputs by dividing the input into a plurality of subsets and processing each subset within the plurality of subsets with a different subset of nodes within the interconnected set of nodes; and
      the plurality of weights comprises:
         bias and weight information for nodes that are part of fully-connected layers within the set of layers; and
         filter and bias information for nodes that are part of convolutional layers within the set of layers;
   an encryption module, stored in memory, that encrypts, using an encryption cipher, the plurality of weights;
   a detection module, stored in memory, that detects that execution of the neural network has been initiated;
   a decryption module, stored in memory, that decrypts, using the encryption cipher, the plurality of weights in response to detecting that the execution of the neural network has been initiated; and
   at least one physical processor that executes the identification module, the encryption module, the detection module, and the decryption module.

13. The system of claim 12, wherein the neural network comprises a hardware neural network that comprises circuit architecture designed to execute neural networks more efficiently than general purpose computer processing unit architecture.

14. The system of claim 13, wherein the decryption module decrypts, by the hardware neural network, the plurality of weights in response to the hardware neural network loading the plurality of weights during the initiation of an execution of the hardware neural network.

15. The system of claim 13, wherein the decryption module decrypts, by the hardware neural network, the plurality of weights in response to the hardware neural network storing the plurality of weights to the hardware neural network.

16. The system of claim 12, wherein the decryption module decrypts, using the encryption cipher, the plurality of weights in response to detecting that the execution of the neural network has been initiated by decrypting, by software executing the neural network, the plurality of weights.

17. The system of claim 16, wherein the decryption module decrypts, by the software executing the neural network, the plurality of weights by:
   decrypting a file that comprises the plurality of weights; and
   executing the file that comprises the plurality of weights.

18. The system of claim 12, wherein the encryption module re-encrypts the plurality of weights in response to determining that that the execution of the neural network has completed.

19. A non-transitory computer-readable medium comprising:
   computer-readable instructions that, when executed by at least one processor of a computing device, cause the computing device to:
   identify a neural network that comprises an interconnected set of nodes organized in a set of layers represented by a plurality of matrices that each comprise a plurality of weights, wherein each weight represents a connection between a node in the interconnected set of nodes that resides in one layer in the set of layers and an additional node in the set of interconnected nodes that resides in a different layer in the set of layers, wherein:
      the neural network comprises a convolutional neural network that processes inputs by dividing the input into a plurality of subsets and processing each subset within the plurality of subsets with a different subset of nodes within the interconnected set of nodes; and
      the plurality of weights comprises:
         bias and weight information for nodes that are part of fully-connected layers within the set of layers; and
         filter and bias information for nodes that are part of convolutional layers within the set of layers;
   encrypt, using an encryption cipher, the plurality of weights;
   detect that execution of the neural network has been initiated; and
   decrypt, using the encryption cipher, the plurality of weights in response to detecting that the execution of the neural network has been initiated.

* * * * *